March 26, 1935.  J. P. TARBOX  1,995,871
AUTOMOBILE BODY
Filed Aug. 16, 1927   2 Sheets-Sheet 1
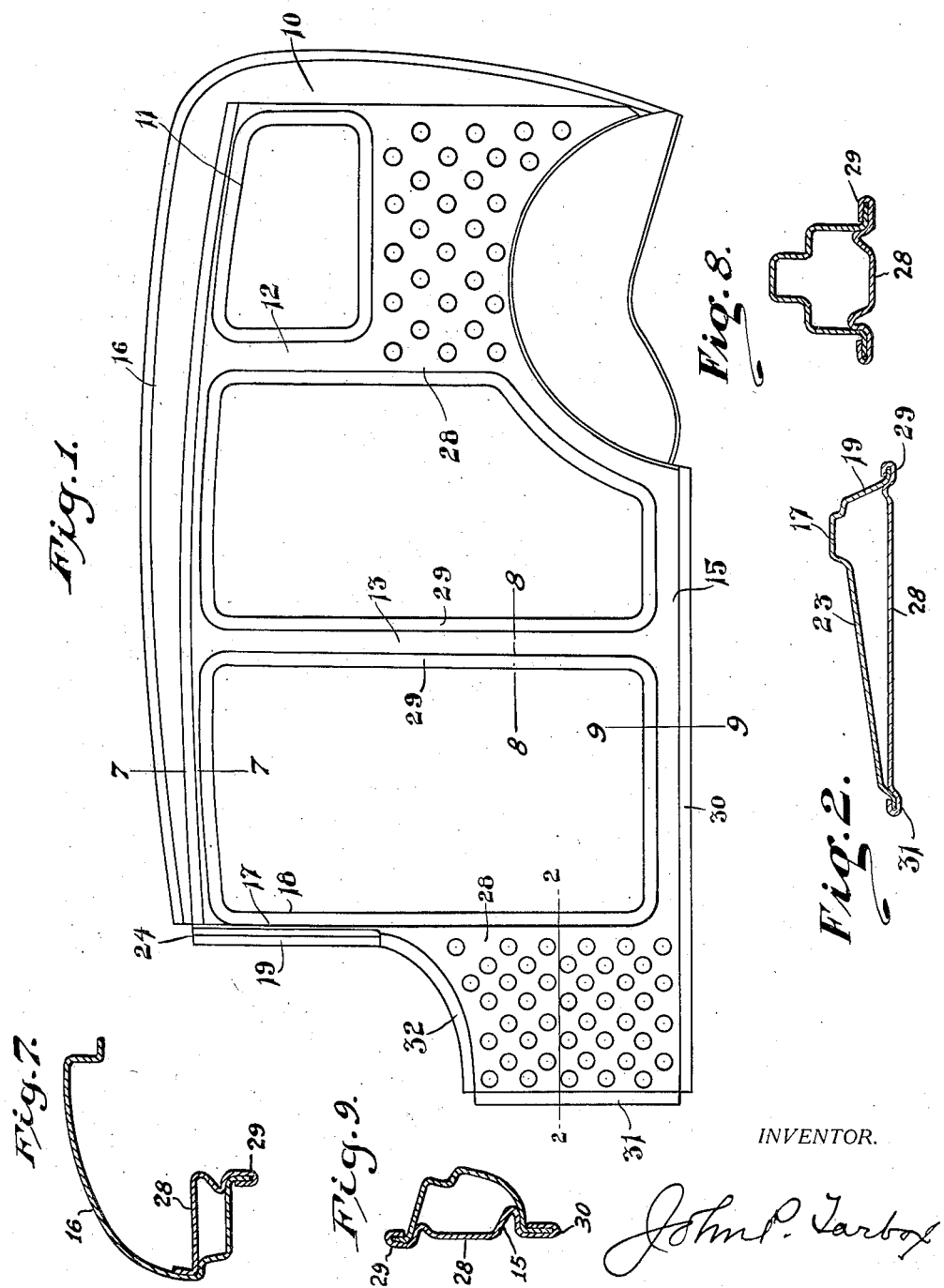
INVENTOR.
John P. Tarbox

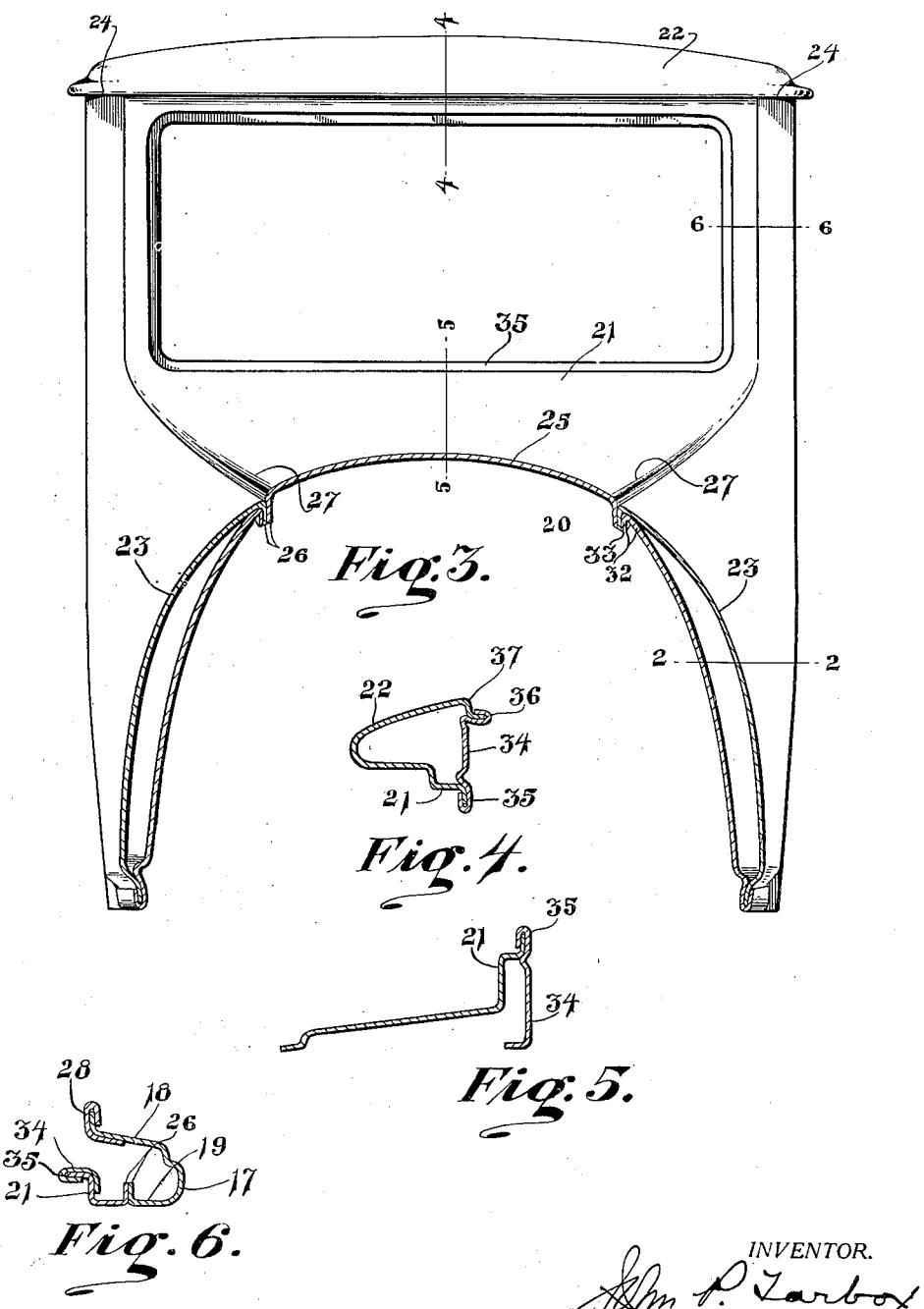

Patented Mar. 26, 1935

1,995,871

UNITED STATES PATENT OFFICE 1,995,871

AUTOMOBILE BODY

John P. Tarbox, Philadelphia, Pa., assignor to Edward G. Budd Manufacturing Company, Philadelphia, Pa., a corporation of Pennsylvania Application August 16, 1927, Serial No. 213,292

21 Claims. (Cl. 296—28)

My invention relates to closed automobile bodies constructed entirely of sheet metal or substantially so, and relates particularly to that type in which the front, side and back walls are constituted as units by unitary die stampings.

The prime object of my invention is to simplify and make less expensive the formation of the front one of such units commonly known as the cowl unit.

The achievement of the formation of the frontal walls including the front posts, the associated cowl, the windshield frame, and the frontal portion of the roof, has its limitations in the limit of the depth (or length) of the cowl portion of the structure. The unitary stamping of this frontal unit is formed by a single operation directed outwardly of the front wall of the body. When drawn by the usual methods, the depth of the cowl is limited.

The object of my invention I attain not by an improved method of drawing, but by a reorganization of the units. I form the front posts in their entirety and the vertically extending side wall of the cowl as a part of the unitary stamping which constitutes the side unit of the body; while I form the windshield frame completely independent of the front door posts, the horizontal or top portion of the cowl, and the frontal extremity of the roof, as the front unit, independently of the vertically extending side walls of the cowl and of the front door posts. In this manner the side walls of the cowl may be drawn by an operation directly laterally of the side wall of the body and of relatively light depth of draw, while the horizontaly extending top wall, instead of being a relatively deep draw is virtually an apron-like extension from the lower header of the windshield frame.

In the accompanying drawings I have illustrated that form of my invention now best known. Of the drawings, Fig. 1 is a side elevation from the inside of the side unit, Fig. 2 is a horizontal section on line 2—2 of Figs. 1 and 3, Fig. 3 is a front elevation of the body of my invention with the cowl in transverse section, Fig. 4 is a transverse section of the upper part of the front unit shown in Fig. 3, taken on line 4—4, Fig. 5 is a transverse section of the lower part of this front unit, taken on line 5—5 and Fig. 6 is a transverse section of the windshield and door frame in conjunction as shown in Fig. 3.

Figs. 7, 8 and 9 are detail sectional views taken approximately on the correspondingly numbered lines of Fig. 1.

The drawings illustrate parts for a four-door sedan body.

As heretofore made, the side units of such bodies as formed in unitary stampings have incorporated a rear side quarter 10 of the body including window opening 11, a rear door post 12, an intermediate door post 13, sill or threshold portion 15, the side quarter of the roof 16, and that portion of the front door post 17 represented by the side wall 18 of this channel-shaped section as shown in Fig. 6. The main body 17 of the post and the front side wall 19 thereof have been formed as a part of the unitary stampings which constitute the front unit embodying cowl 20 in its entirety, windshield frame 21 and the frontal margin 22 of the roof.

According to my invention I constitute the entire front post structure 17, 18, 19, a part of the unitary stamping of the side unit, and likewise the entire vertically extending side wall 23 of the cowl. That this involves a relatively shallow draw as compared with a relatively deep draw of the old method can readily be appreciated by comparison between depth of the cross section of the vertically extending walls as shown in Fig. 3 and the longitudinal depth of the cowl as shown in Figs. 1 and 2.

The front unit is comprised of a windshield frame 21 complete in entirety independently of the front posts 17 as clearly appears in Figs. 4 to 6. At its top it is surmounted by the frontal extremity 22 of the roof, the opposite ends of which overlie the tops 24 of the posts 17. At the bottom there projects forwardly in an apron like manner a horizontally extending top portion 25 of the cowl which terminates at the upper margins of the vertically extending side walls 23. The depth of draw of this part too is relatively shallow.

The side and front units are secured together in the planes of and along the margins of the posts 17 and windshield 21 and also in the mating terminal edges of the vertically and horizontally extending sections of the cowl 23 and 25. Securement as illustrated is by means of inturned flanges 26 on the respective units, which flanges are welded or otherwise secured together. Preferably, the horizontally extending top portion 25 of the cowl is at its terminal edges 27 raised slightly above the mating terminal edge of the vertically extending wall 23 to produce an ornamental effect at the joint. To heighten this ornamental effect the joint as it emanates from the posts 17 may sweep smoothly along in chosen ornamental contour lines or surfaces into the contour lines or surfaces of the motor hood which very commonly converges forwardly toward the peak of the radiator.

Both the side unit and the front unit of the construction of my invention are provided with inner reinforcing panels. That of the side unit appearing in Figs. 1 and 2 is designated 28. It will be observed that this inner panel is crimped to the outer panel not only as at 29 around the entire door openings, but also is crimped as at 30 at the bottom of the sill and at 31 at the fore end of the cowl as appears clearly in section in Fig. 2. It is not thought necessary to illustrate the crimped joints 30 since they are in general similar to those shown in Fig. 2. At the upper terminal edge 32 this panel is provided with a flange 33 (Fig. 3) welded or otherwise secured to one at least of the inturned flanges 26 of the outer stamping of the unit.

In the case of the front unit the inner panel 34 is substantially rectangular in form as appears by reference to sections shown in Figures 4 to 6, and is crimped to the outer stamping throughout the entire margin of the windshield opening as indicated at 35 and also crimped as indicated at 36 to the rear terminal edge 37 of the frontal portion of the roof structure. These inner panels like the main bodies of the units, are unitary die stampings.

Not only does the structure of my invention overcome the limitations of depth, but it generally simplifies the structure and lowers the cost. Yet other advantages not necessarily mentioned here will appear to those skilled in the art.

The generic spirit of the invention requires all permissible breadth of interpretation to apply to the annexed claims.

What I claim is:—

1. A side wall unit for closed body automobile construction comprising a forward door frame extending entirely around the doorway opening and a vertically extending portion of a cowl formed as a unitary die stamping, and having an inner paneling substantially co-extensive with said unitary die stamping and joined thereto in the margin of the doorway and in the outer margins.

2. A side wall unit for closed body automobile construction comprising a forward door frame extending entirely around the doorway opening and a vertically extending portion of a cowl formed as a unitary die stamping in combination with a front wall unit comprising a rectangular windshield frame adapted to extend from front post to front post of the door frames together with the horizontally extending top portion of the cowl, which said parts of the front unit are likewise comprised of a unitary sheet metal stamping.

3. A closed automobile body comprises of a side wall unit embodying a front door frame extending entirely around the doorway opening and connected vertically extending side wall of a cowl connected in the plane of the front door post and in the top edge of the vertically extending cowl wall with a front unit comprising a vertically extending windshield frame extending entirely around the windshield opening and connected horizontally extending top portion of the cowl.

4. A side wall unit for closed body automobile construction comprising a forward door frame extending entirely around the doorway opening and a vertically extending portion of a cowl formed as a unitary die stamping, and having an inner paneling co-extensive with said unitary die stamping and crimped thereto entirely around the doorway opening and also in the front edge of the cowl.

5. A closed automobile body comprised of a side wall unit embodying a front door frame extending entirely around the doorway opening and connected vertically extending side wall of a cowl connected in the plane of the front door post and in the top edge of the vertically extending cowl wall with a front unit comprising a vertically extending windshield frame extending entirely around the windshield opening and connected horizontally extending top portion of the cowl, joinder of the units being by mating inturned flanges on the respective units.

6. A front construction unit for automobile bodies comprising a windshield frame extending entirely around the windshield opening and providing paneling as well as framing around said opening, and connected horizontally extending cowl top which terminates laterally substantially in the plane of the vertically extending side walls of the completed body, the whole being comprised of a unitary die stamping.

7. A front construction unit for automobile bodies comprising a windshield frame extending entirely around the windshield opening and connected horizontally extending cowl top which terminates laterally substantially in the plane of the vertically extending side walls of the completed body, the whole being comprised of a unitary die stamping, together with a unitary die stamping constituting a substantially co-extensive inner panel for said windshield frame joined thereto in the windshield opening and in the upper margins.

8. A front construction unit for automobile bodies comprising a windshield frame extending entirely around the windshield opening and a connected horizontal extending cowl top which terminates laterally substantially in the plane of the vertically extending side walls of the completed body, and a connected frontal extremity of the roof of the body terminating rearwardly behind the plane of the windshield frame.

9. A side wall unit for closed body automobile construction comprising a unitary die stamping forming at least a front vertical portion of the door frame and paneling extending above the cowl and a connected vertically extending portion of the cowl panel carrying forward the inner edge of the vertical door frame portion the full depth of the cowl.

10. A front construction unit for automobile bodies comprising the bottom and side portions of a windshield frame and paneling and a connected forwardly extending cowl top panel carrying forward the lateral edges of said frame portion the full depth of the cowl and formed therewith as a unitary stamping.

11. A side wall unit for closed body automobile constructions comprising a forward door frame portion extending entirely around the doorway opening and providing paneling as well as framing around said opening and a vertically extending portion of a cowl panel carrying forward the inner edge of the door frame portion to the depth of the cowl and formed therewith as a unitary die stamping.

12. In a vehicle body construction, a panel unit comprising a pair of stampings having relatively narrow top portions forming corner pillar sections and relatively wide lower portions forming side cowl sections, and a third stamping secured to said lower portions and forming a top cowl section.

13. In vehicle body construction, a panel unit comprising a pair of stampings having relatively narrow top portions forming corner pillar sections and relatively wide lower portions forming side cowl sections, a third stamping secured to said lower portions and forming a top cowl section, and a fourth stamping secured to the third and forming an instrument panel.

14. In vehicle body construction, a panel unit comprising a pair of stampings having relatively narrow top portions forming corner pillar sections and relatively wide lower portions forming side cowl sections and a third stamping secured to said lower portions and forming a top cowl section, said third stamping having a flange formed thereon and an instrument panel stamping having a flange mating with the aforesaid flange and secured thereto.

15. In vehicle body construction, a panel unit comprising a pair of stampings having relatively narrow top portions forming corner pillar sections and relatively wide lower portions forming side cowl sections and a third stamping secured to said lower portions and forming a top cowl section, said third stamping having a flange formed thereon and said pair of stampings having flanges thereon mating with the flange on the third stamping and secured thereto.

16. In a cowl unit for vehicle bodies, independently formed pressed metal shroud panel side members, upwardly extending door pillar elements formed integrally therewith, and an intermediate pressed metal shroud panel member secured to said shroud panel side members to form a complete cowl shroud panel.

17. In a cowl unit for vehicle bodies, a pair of spaced pressed metal shroud panel side members having door pillar elements formed integral therewith and extending upwardly therefrom, and an intermediate shroud panel member bridging the space between and welded to said side members to form a complete cowl unit.

18. A cowl unit for vehicle bodies comprising, a pair of independently formed pressed metal shroud panel side members having integral door pillar elements and finishing panels formed therewith, and an intermediate pressed metal shroud panel member welded along its ends to the upper ends of said side members to form a complete cowl unit.

19. A cowl unit for vehicle bodies comprising, three members, namely, two independently formed side members including integral door pillar elements, and an intermediate member welded at its ends to the upper ends of said side members.

20. In a vehicle body construction, a panel construction comprising a pair of metal stampings for side panels formed in their upper portions to form pillar members which extend from the top of the windshield to the bottom of the body and having forwardly extending lower side portions forming the sides of the cowl section, and a single metal stamping forming a central panel member extending between and secured to the upper edges of the forwardly extending portions of the side panels and forming the top of the cowl section.

21. In a closed vehicle body construction, panel construction comprising a pair of metal stampings each formed to provide a forward body pillar element extending from the top of the windshield to the bottom of the body and form a side of the cowl section, and a stamping formed to join the upper portions of said cowl sides and forming the top of the cowl section.

JOHN P. TARBOX.